(12) United States Patent
Buyuktosunoglu et al.

(10) Patent No.: US 11,360,772 B2
(45) Date of Patent: Jun. 14, 2022

(54) INSTRUCTION SEQUENCE MERGING AND SPLITTING FOR OPTIMIZED ACCELERATOR IMPLEMENTATION

(71) Applicant: INTERNATIONAL BUSINESS MACHINES CORPORATION, Armonk, NY (US)

(72) Inventors: Alper Buyuktosunoglu, White Plains, NY (US); David Trilla Rodriguez, Barcelona (ES); John-David Wellman, Hopewell Junction, NY (US); Pradip Bose, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 16/836,794

(22) Filed: Mar. 31, 2020

(65) Prior Publication Data

US 2021/0303306 A1    Sep. 30, 2021

(51) Int. Cl.
*G06F 9/30* (2018.01)
*G06F 9/32* (2018.01)

(52) U.S. Cl.
CPC .......... *G06F 9/30181* (2013.01); *G06F 9/321* (2013.01)

(58) Field of Classification Search
CPC .............................. G06F 9/30181; G06F 9/321
See application file for complete search history.

(56) References Cited

U.S. PATENT DOCUMENTS

| 8,904,151 B2 * | 12/2014 | Gschwind | G06F 9/382 |
| | | | 712/220 |
| 10,025,813 B1 * | 7/2018 | Gebremariam | G06F 7/02 |
| 10,474,442 B2 * | 11/2019 | Venkatasubramanian | |
| | | | G06F 8/433 |
| 10,725,755 B2 * | 7/2020 | Sager | G06F 9/3851 |
| 2003/0225998 A1 | 12/2003 | Khan et al. | |
| 2011/0066829 A1 * | 3/2011 | Tye | G06F 8/4441 |
| | | | 712/226 |
| 2018/0315398 A1 | 11/2018 | Kaul et al. | |
| 2019/0042923 A1 | 2/2019 | Janedula et al. | |

OTHER PUBLICATIONS

Gupta et al.; Bundled Execution of Recurring Traces for Energy-Efficient General Purpose Processing; ACM; 2011 (Year: 2011).*
"A Graph-Based Program Representation for Analyzing Hardware Specialization Approaches" Nowatzki et al. IEEE Computer Architecture Letters vol. 14, Issue 2, Jul.-Dec. 1, 2015 pp. 94-98.
"DySER: Unifying Functionality and Parallelism Specialization for Energy-Efficient Computing" Govindaraju et al. IEEE Computer Society 2012 (14 Pages).

(Continued)

*Primary Examiner* — Corey S Faherty
(74) *Attorney, Agent, or Firm* — Griffiths & Seaton PLLC

(57) ABSTRACT

Embodiments for implementing optimized accelerators in a computing environment are provided. Selected instruction sequence code blocks derived from one or more application workloads may be consolidated together to activate one or more accelerators subject to one or more constraints and projections.

20 Claims, 13 Drawing Sheets

(56) References Cited

OTHER PUBLICATIONS

"Automatic design of domain-specific instructions for low-power processors" Gonzalez-Alvarez et al. Jul. 27-29, 2015 IEEE 26th International Conference on Application-specific Systems, Architectures and Processors.
"A framework for automated architecture-independent gadget search" authors Dullien et al. (10 Pages).
"Function Merging by Sequence Alignment" Rocha et al. Conference Paper • Feb. 2019 DOI: 10.1109/CGO.2019.8661174 (14 Pages).
"Efficient path profiling" Authors Thomas Ball and James R. Larus 1996 IEEE. Published in the Proceedings of MICRO-29, Dec. 2-4, 1996, in Paris, France. (12 Pages).
"LegUp: high-level synthesis for FPGA-based processor/accelerator systems" Canis et al. FPGA'11, Feb. 27-Mar. 1, 2011, Monterey, California (4 Pages).
"Needle: Leveraging Program Analysis to Analyze and Extract Accelerators from Whole Programs" Kumar et al. Feb. 4-8, 2017 Ieee International Symposium on High Performance Computer Architecture.

* cited by examiner

PHASE-1(IS SELECTION)

PHASE 1 - SUPPORTS SEVERAL SELECTION PROCESSES:

A) STEPS: PERFORM STEPS 1 → 2 → 3
1. EXTRACT HOT INSTRUCTION SEQUENCES (IS)
2. FOR EACH IS SEARCH FOR SIMILAR IS FROM WITHIN APPLICATION ("MATCHES")
3. CONSIDER MERGES OF EACH IS WITH THE SELECTED MATCHES (FROM APPLICATION)

B) STEPS: PERFORM STEPS 1 → 3
1. EXTRACT HOT INSTRUCTION SEQUENCES (IS)
3. MERGE IS FROM WITHIN THE SET OF EXTRACTED IS

C) STEPS: PERFORM STEPS 2 → 3
2. SPECIFY AN ARBITRARY IS (FUNCTION, BASIC BLOCK); SEARCH FOR "MATCHES" IN APPLICATION
3. MERGE TOGETHER MATCHES FROM THE APPLICATION (BUT NOT WITH THE INITIAL IS)

FIG. 6A

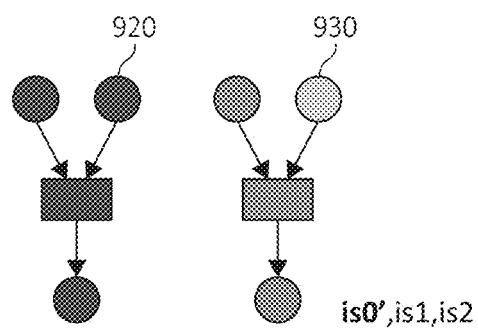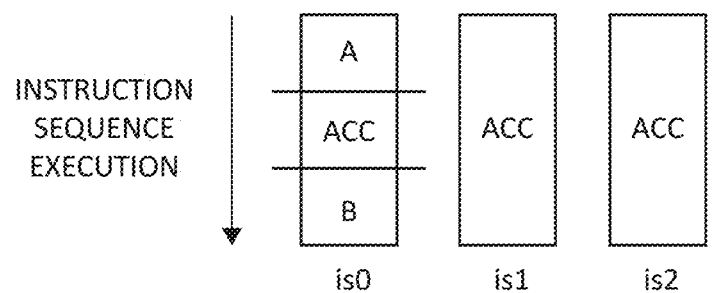
FIG. 9C

INSTRUCTION SEQUENCE MERGING AND SPLITTING FOR OPTIMIZED ACCELERATOR IMPLEMENTATION

GOVERNMENT LICENSE RIGHTS TO CONTRACTOR-OWNED INVENTIONS MADE UNDER FEDERALLY SPONSORED RESEARCH AND DEVELOPMENT

This invention was made with Government support under Contract no.: HR-0011-18-C-0122 awarded by Defense Advanced Research Projects Agency (DARPA). The Government has certain rights to this invention.

BACKGROUND OF THE INVENTION

Field of the Invention

The present invention relates in general to computing systems, and more particularly to, various embodiments for providing instruction sequence merging and splitting for optimized accelerator implementation in a computing environment.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for providing instruction sequence merging and splitting for optimized accelerator implementation in a computing environment are provided. A plurality of instruction sequence code blocks may be identified from one or more one or more application workloads. A splitting and/or merging operation of the plurality of instruction sequence code blocks may be iteratively performed according to one or more constraints and projections results. Selected instruction sequence code blocks derived from one or more application workloads may be consolidated together to activate one or more accelerators subject to one or more constraints and projections.

In addition to the foregoing exemplary method embodiment, other exemplary system and computer product embodiments are provided and supply related advantages.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A is an additional block diagram depicting operations for providing instruction sequence merging and splitting for optimized accelerator implementation in a first phase a computing environment in accordance with an embodiment of the present invention;

FIGS. 9A-9C are additional block diagram depicting an exemplary operation performing a splitting and merging operation in accordance with an embodiment of the present invention.

DETAILED DESCRIPTION OF THE DRAWINGS

Figure 1:
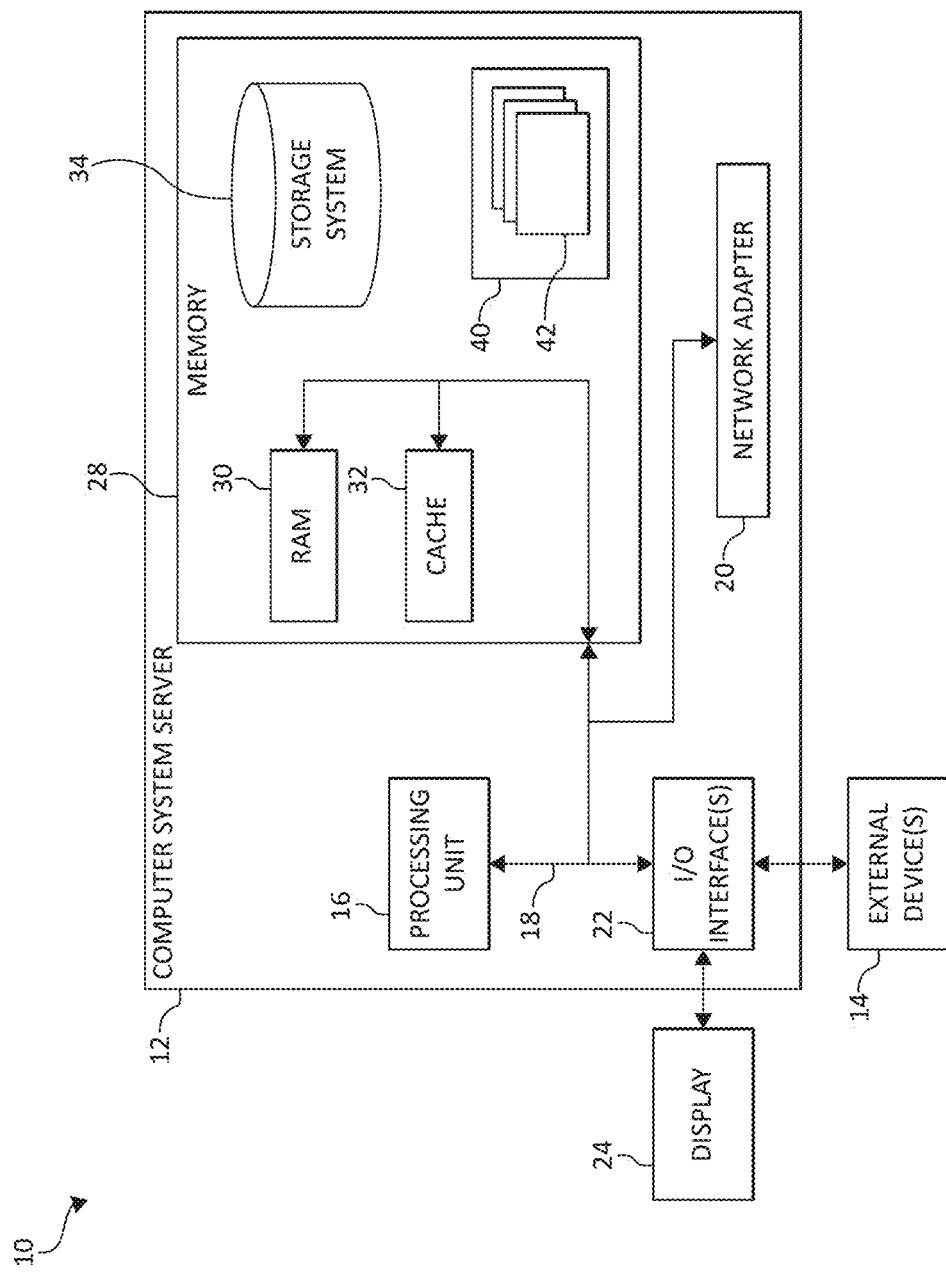
FIG. 1 is a block diagram depicting an exemplary computing node, according to embodiments of the present invention.

Currently, many computer systems employ accelerators (e.g., co-processors such as Graphical Processing Units (GPUs)) to enhance the performing of such system, where programs run on both the CPU and the accelerators. New applications rely on hardware accelerators to achieve the necessary performance. The granularity at which acceleration must be implemented is initially unknown. Said differently, the application-level granularity at which acceleration is best implemented may be unknown from dynamic profiling alone such as, for example, a large number of profiled "hot" dynamic instruction sequences ("IS" blocks) where each contributes little to overall execution time, a small number of dynamic IS blocks that collectively contribute a large amount of overall execution time, or a combination thereof. Additionally, computing hardware resources are scarce and have multiple implicit costs such as, for example, a number of available accelerator sockets and their size may be limited, or the overall accelerator area and power may be limited or in use/busy. Furthermore, in today's computing environment, innovation and advancement in application/software is relatively rapid and fact and outpaces hardware development.

Thus, one current challenge in computer systems is how to systematically derive IS code blocks for use as hardware acceleration primitives, from a given set of (one or more) applications, given design constraints (e.g., area, power) and marginal benefit particularly since new applications rely on hardware accelerators to achieve the necessary performance. Thus, a need exists to execute systematic operations to both identify "hot" IS code blocks and form a precise or "optimized" set of IS code blocks (from the hot IS code blocks) for acceleration based on design constraints while yielding maximized benefits (e.g., power-performance boost) deemed to be accomplish intended objectives.

In one aspect, "hot instruction sequences" (or hot IS code blocks) may be instruction sequences that are frequently accessed or used. Cold instruction sequences may be less frequently accessed or used (as compared to hot instruction sequences).

Thus, the present invention provides for automatically detecting hot code regions and generate optimized accelerators to maximize performance/energy for a given computing hardware space (e.g., chip area). In one aspect, the present invention may identify a set of hot code regions (IS blocks or IS code blocks) from a selected workload (e.g., a workload of interest), which may be derived using a profiling tool. Although the set of hot code regions may too large a set to consider for h/w acceleration, the present invention will take the derived set of hot code regions and iteratively merge and split (e.g., merge-split process) of building up IS blocks to a granularity that meets design constraints and benefit expectations. That is, merge opportunities are discovered using an agile, modular, automated process (e.g., a broader search, better optima. The merge opportunities refer to IS that are suitable for applying merge operations amongst the various instruction sequences.

A scoring and/or ranking operation may be used to indicate which merge recommendations are most beneficial or optimized based on the various constraints, performance expectations, and/or hardware configurations. Thus, a parameterized merge operation (e.g., a merge operation whose outcome is determined on a series of parameters defined by the user) may enable hardware-constrained optimization. The ranked IS code blocks (which is blended relevant regions of IS code), having been merged and split, may be parameterized merge operation to enable hardware-constrained optimization. Thus, mechanisms of the illustrated embodiments provide for automated construction of consolidated IS code-blocks derived through hierarchical merge-split operations effected on the initially identified "hot" IS code blocks.

In an additional aspect, various embodiments provide for implementing optimized accelerators in a computing environment are provided. A plurality of instruction sequence code blocks may be identified from one or more one or more application workloads. A splitting and/or merging operation of the plurality of instruction sequence code blocks may be iteratively performed according to one or more constraints and projections results. Selected instruction sequence code blocks derived from one or more application workloads and the splitting and merging operation may be consolidated together to activate one or more accelerators subject to one or more constraints and the projections (e.g., estimated projection results).

In an additional aspect, the present invention provides for consolidating instruction sequence code blocks (derived from one or more software application workloads) for the purpose of deriving hardware accelerators that meet specified design constraints and projected benefits of hardware acceleration. The design constraints may include one or more metrics, (e.g., accelerator slots, individual accelerator area, power, latency, etc.). The benefits of hardware acceleration may include one or more metrics (e.g., system-level performance speed-up, energy reduction factor, performance-per-watt increase, etc.).

The consolidation operation may include a systematic, iterative merge-split process effected on a starting set of hot instruction sequence code blocks. The merge-split process may be controlled and constrained by the metrics. The starting set of hot instruction sequence code blocks may be updated after each merge-split loop iteration of the process. A final selection of the most optimized/best merged instruction sequence blocks may be provided/affected using a programmable (parameterized) benefit scoring formula.

It should be noted that there may be constraints in the development of the accelerators which may be used in the development of the of accelerators, etc. Similarly, the present invention may use projections (i.e., estimates) of the area, power, etc. in relation to the constraints (on those similar properties) of a design space, to determine/select the appropriate accelerator(s). The accelerators themselves may also have constraints that may influence the feasibility of the accelerator's implementation for mechanisms of the illustrated embodiments (i.e., how the accelerator's constraints affects the design constraints). Thus, instruction sequence code blocks (derived from one or more software application workloads) for the purpose of deriving hardware accelerators that meet specified design constraints and projected benefits of hardware acceleration.

In general, as used herein, "optimize" or "best" may refer to and/or defined as "maximize," "minimize," or attain one or more specific targets, objectives, goals, or intentions. Optimize may also refer to maximizing a benefit to a user (e.g., performance, power-performance, performance speed-up, energy reduction factor, or other defined/intended benefit). Optimize may also refer to making the most effective or functional use of a situation, opportunity, or resource.

Additionally, "optimize" need not refer to a best solution or result, but may refer to a solution or result that "is good enough" for a particular application, for example. In some implementations, an objective is to suggest a "best" combination documents/potential causes relating to a query, but there may be a variety of factors that may result in alternate suggestion of a combination of documents/potential causes yielding better results. For example, an optimization problem may search for a combination of factors that result in a minimum and/or maximum combination of documents/potential causes. Such factors may include particular documents/potential causes characteristics. Thus, some changes to the variety of factors may result in a jump from one minimum/maximum to another minimum/maximum. In either case, resulting suggestions of documents/potential causes may be considered "good enough," "substantially optimal," and/or "sufficiently good." Herein, the term "optimize" may refer to such results based on minima (or maxima, depending on what parameters are considered in the optimization problem) for suggesting of a combination of documents/potential causes.

In an additional aspect, the terms "optimize" and/or "optimizing" may refer to an operation performed in order to achieve an improved result (e.g., packing travel articles) such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Other examples of various aspects of the illustrated embodiments, and attendant benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
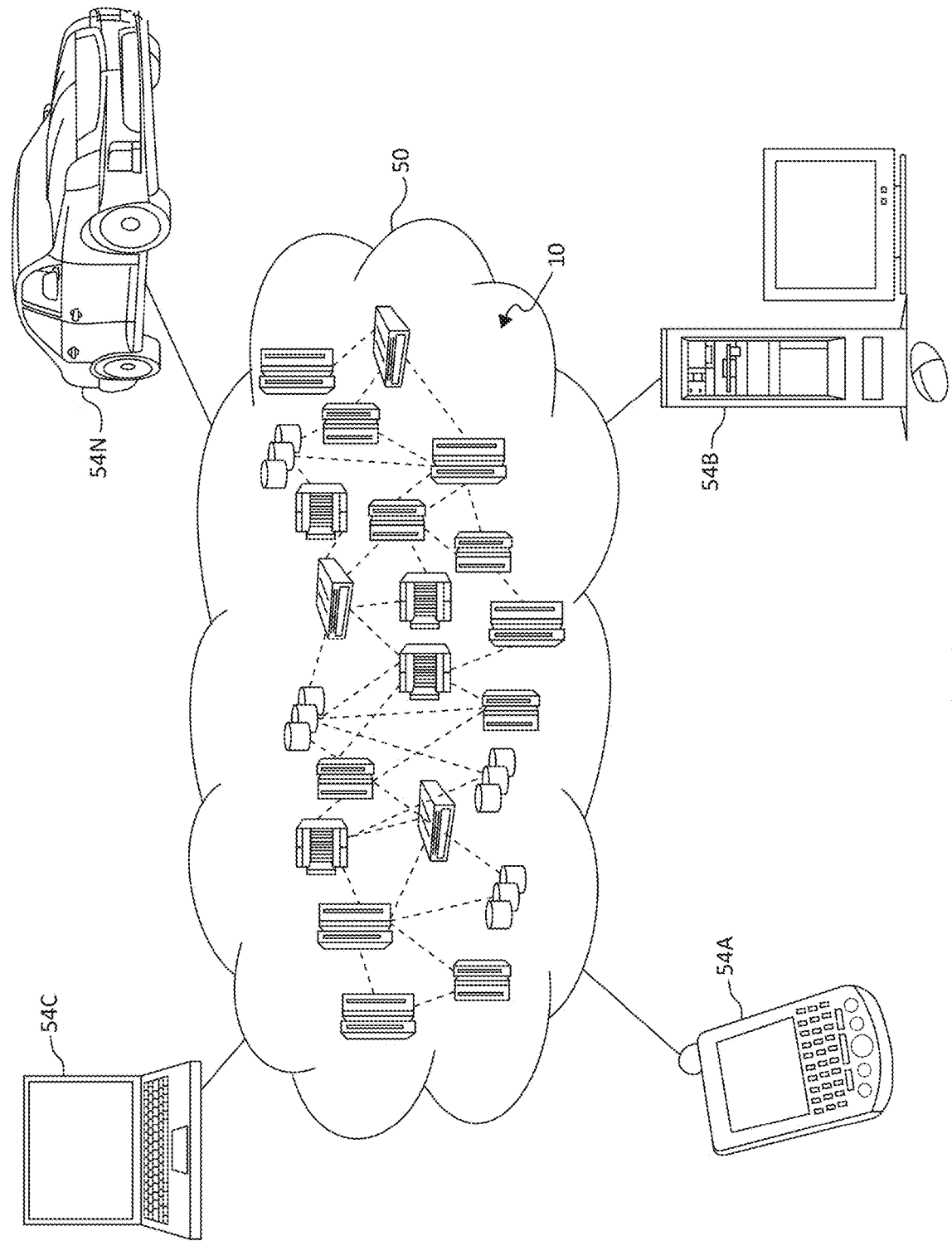
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
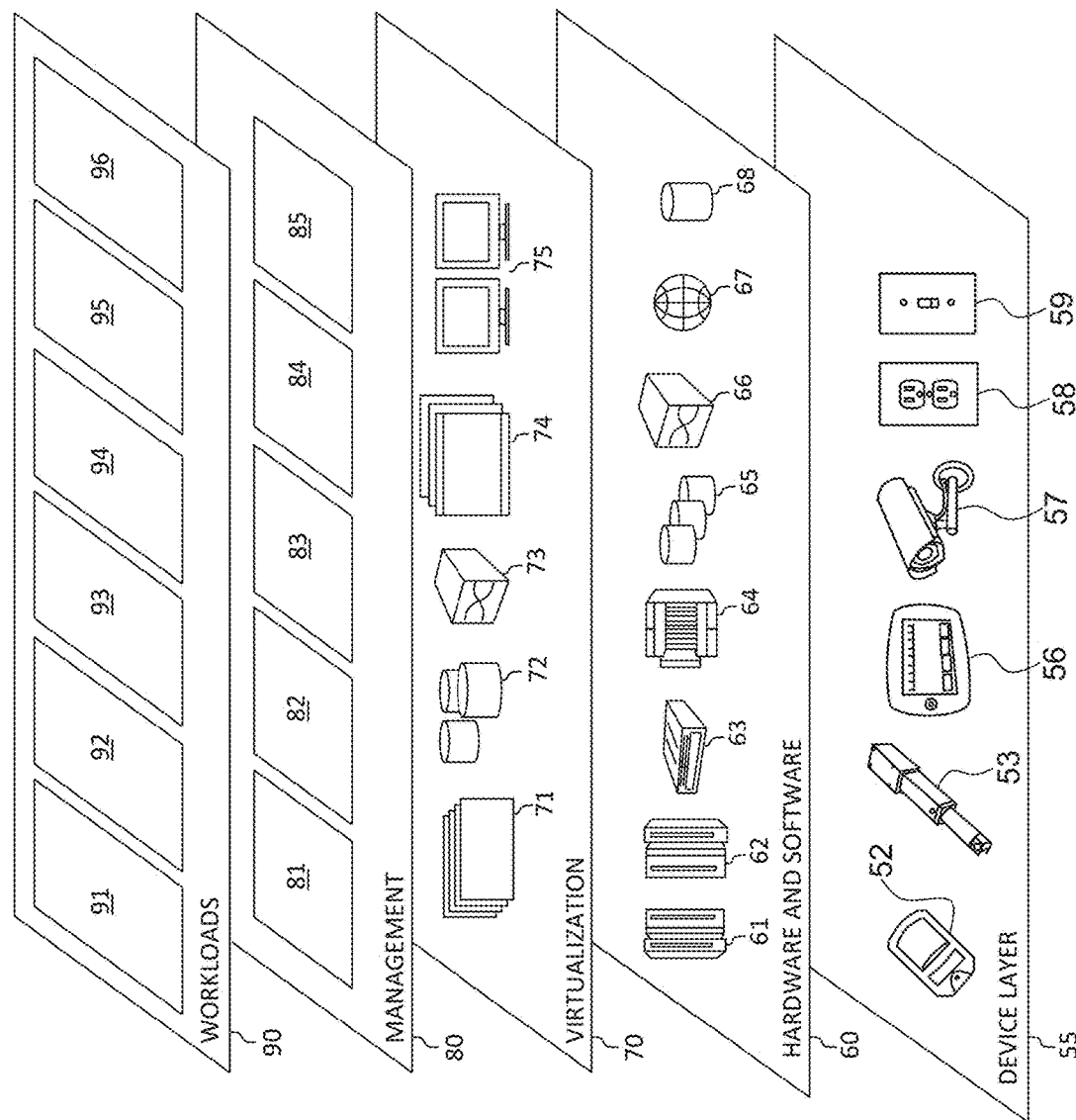
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing instruction sequence merging and splitting for optimized accelerator implementation. In addition, workloads and functions 96 for providing instruction sequence merging and splitting for optimized accelerator implementation may include such operations as data analytics, data analysis, and as will be further described, detection and comparison functionality. One of ordinary skill in the art will appreciate that the workloads and functions 96 for providing instruction sequence merging and splitting for optimized accelerator implementation may also work in conjunction with other portions of the various abstractions layers, such as those in hardware and software 60, virtualization 70, management 80, and other workloads 90 (such as, for example, data analytics processing 94, for example) to accomplish the various purposes of the illustrated embodiments of the present invention.

Figure 4:
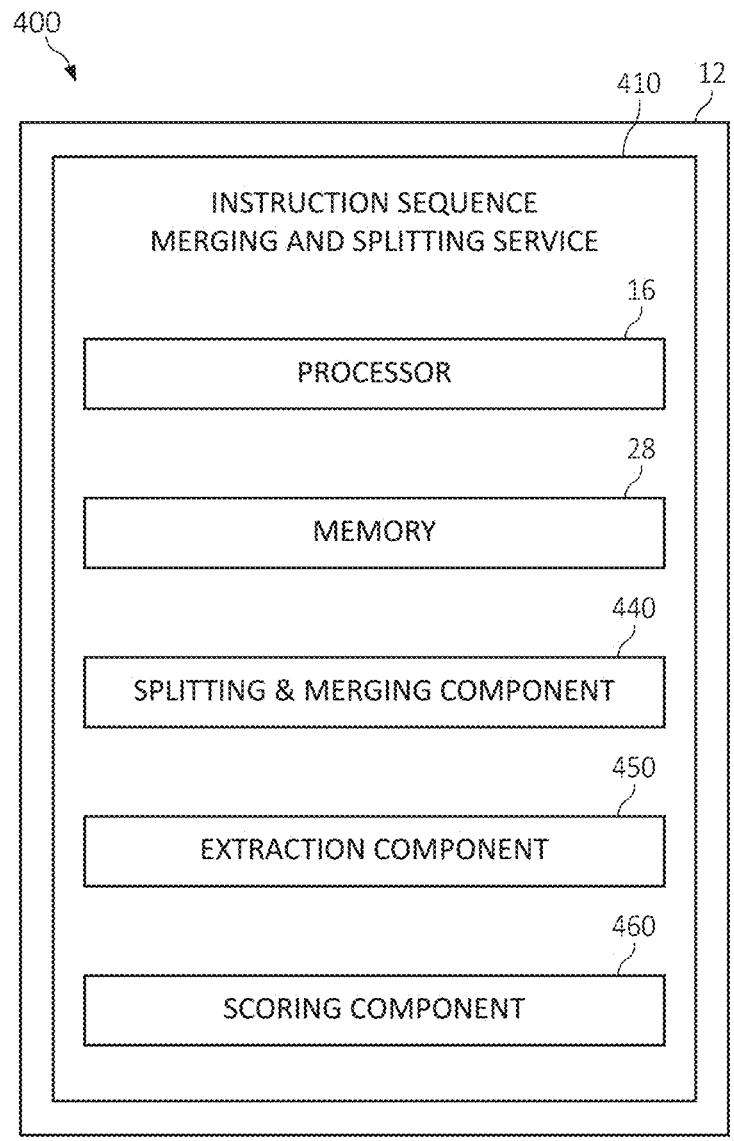
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for providing instruction sequence merging and splitting for optimized accelerator implementation in a computing environment. In one aspect, one or more of the components, modules, services, applications, and/or functions described in FIGS. 1-3 may be used in FIG. 4. In one aspect, repetitive description of like elements, components, modules, services, applications, and/or functions employed in other embodiments described herein (e.g., FIGS. 1-3) is omitted for sake of brevity.

With the foregoing in mind, the module/component blocks 400 may also be incorporated into various hardware and software components of a system for providing instruction sequence merging and splitting for optimized accelerator implementation in a computing system in accordance with the present invention. Many of the functional blocks 400 may execute as background processes on various components, either in distributed computing components, or on the user device, or elsewhere.

Computer system/server 12 of FIG. 1 is shown incorporating an instruction sequence merging and splitting service 410. The instruction sequence merging and splitting service 410 may incorporate processing unit 16 ("processor") and memory 28 of FIG. 1 to perform various computational, data processing and other functionality in accordance with various aspects of the present invention. The instruction sequence merging and splitting service 410 may be provided by the computer system/server 12 of FIG. 1.

As one of ordinary skill in the art will appreciate, the depiction of the various functional units in the instruction sequence merging and splitting service 410 is for purposes of illustration, as the functional units may be located within the instruction sequence merging and splitting service 410 or elsewhere within and/or between distributed computing components.

In one aspect, the computer system/server 12 and/or the instruction sequence merging and splitting service 410 may provide virtualized computing services (i.e., virtualized computing, virtualized storage, virtualized networking, etc.). More specifically, the instruction sequence merging and splitting service 410 may provide, and/or be included in, a virtualized computing, virtualized storage, virtualized networking and other virtualized services that are executing on a hardware substrate.

The instruction sequence merging and splitting service 410 may provide and/or be associated with a splitting and merging component 440, an extraction component 450, and a scoring component 460, each of which may be in communication with each other.

In one aspect, the instruction sequence merging and splitting service 410, using one or more of the splitting and merging component 440, the extraction component 450, and/or the scoring component 460, may consolidate together selected instruction sequence code blocks derived from one or more application workloads to activate one or more accelerators subject to one or more constraints and projections (e.g., estimated projection benefits or costs). The splitting and merging component 440 may define the one or more constraints according to one or more selected metrics. The splitting and merging component 440 may also estimate the estimated projection results according to according to selected metrics, factors, parameters, or a combination thereof (e.g., hardware/chip performance speed, an energy reduction factor, performance factor, etc.).

The splitting and merging component 440 may perform a splitting and merging operation on a plurality of instruction sequence code blocks according to the one or more constraints and the estimated projection results.

The splitting and merging component 440, in association with the extraction component 450, may select and/or extract the selected instruction sequence code blocks from the plurality of instruction sequence code blocks that are split and merged.

The splitting and merging component 440, in association with the extraction component 450, may update the plurality of instruction sequence code blocks with additional instruction sequence code blocks upon completion of at least one iteration of the merging and splitting.

The splitting and merging component 440, in association with the scoring component 460, may assign a score to each merged instruction sequence code blocks according to a degree of relevance to the one or more constraints and the estimated projection results. The splitting and merging component 440, in association with the scoring component 460, may select as the selected instruction sequence code blocks those of the merged instruction sequence code blocks based on the assigned score.

Figure 5:
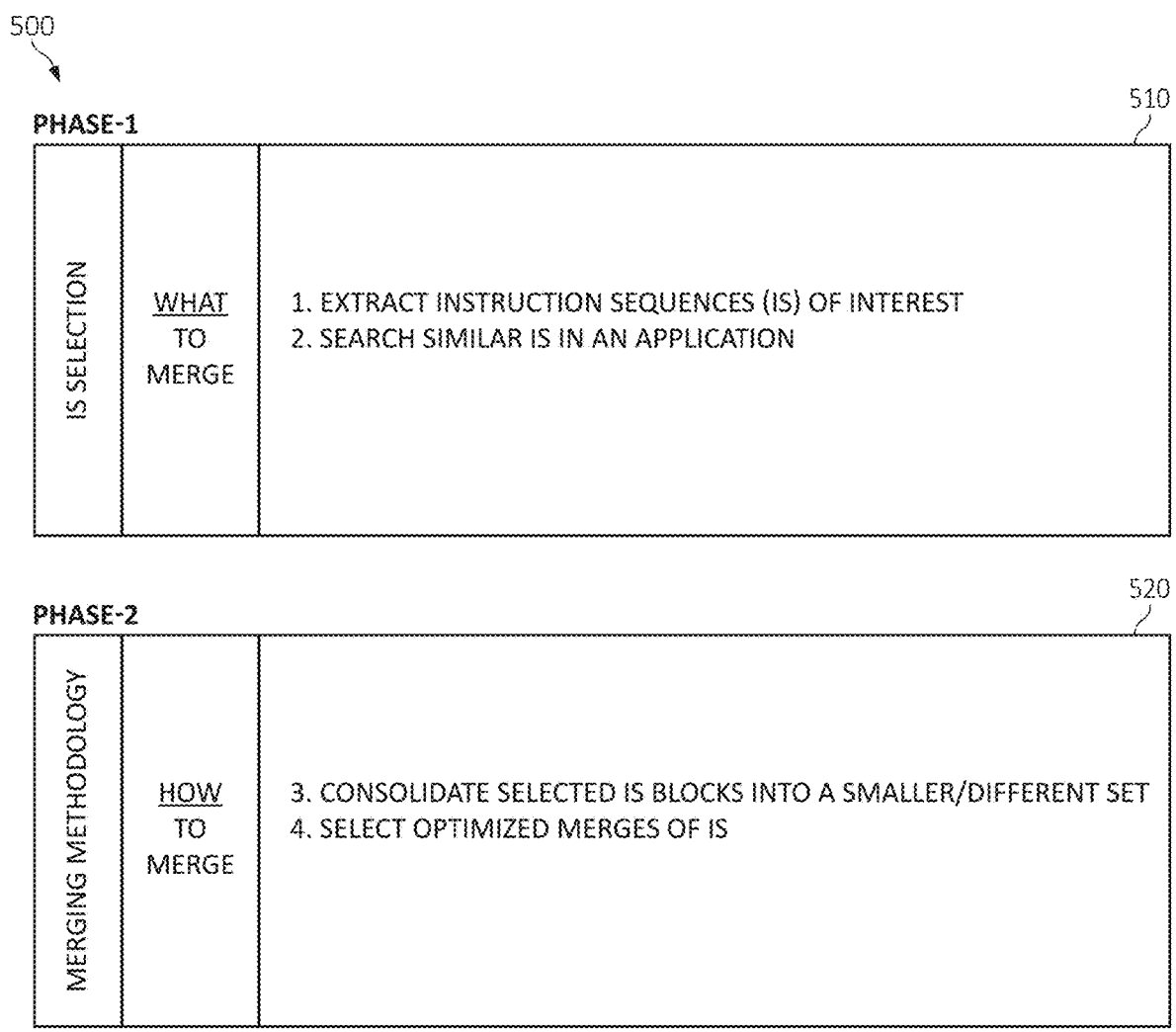
FIG. 5 is an additional block diagram depicting operations for providing instruction sequence merging and splitting for optimized accelerator implementation using multiple phases a computing environment in accordance with an embodiment of the present invention.

Turning now to FIG. 5, a block diagram 500 for providing instruction sequence merging and splitting for optimized accelerator implementation using multiple phases in a computing system is depicted. In one aspect, one or more of the components, modules, services, applications, and/or functions described in FIGS. 1-4 may be used in FIG. 5. In one aspect, repetitive description of like elements, components, modules, services, applications, and/or functions employed in other embodiments described herein (e.g., FIGS. 1-4) is omitted for sake of brevity.

As depicted in block 510, a first phase (e.g., "phase 1") is depicted for identifying one or more IS sequences for selection. A determination may be performed to determine "what to merge" based on one or more constraints, performance benefits, or a combination thereof. In operation in the first phase, in step 1) one or more instruction sequences ("IS") of interest to an entity may be extracted. That is, one or more profiling tools may be used to profile an application and extract instruction sequences that are highly executed (e.g., "hot") with a large performance contribution. In step 2) a similar search of the IS may be performed in an application for the IS selection. A pattern matching tool may be used to search in each of the applications for similar or related hot instruction sequences based on a resemblance scoring operation.

As depicted in block 520, a second phase (e.g., phase-2) is depicted for merging (e.g., merging operation). A determination may be performed to determine "how to merge." For example, in the second phase, in step 3) selected IS code blocks may be consolidated in smaller and different sets of IS code blocks. A hierarchical and iterative merging and splitting operation may be used to determine those of the selected IS code blocks as the optimized set of IS code blocks (e.g., super or optimized IS code blocks). In step 4) those of the optimized set of IS code blocks may be merged. That is, a scoring operation may be executed to assign a score to the selected IS code blocks for selecting those of the optimized set of IS code blocks (e.g., determine which "super" IS blocks are the best ones to be merged (Scoring)).

Figure 6B:
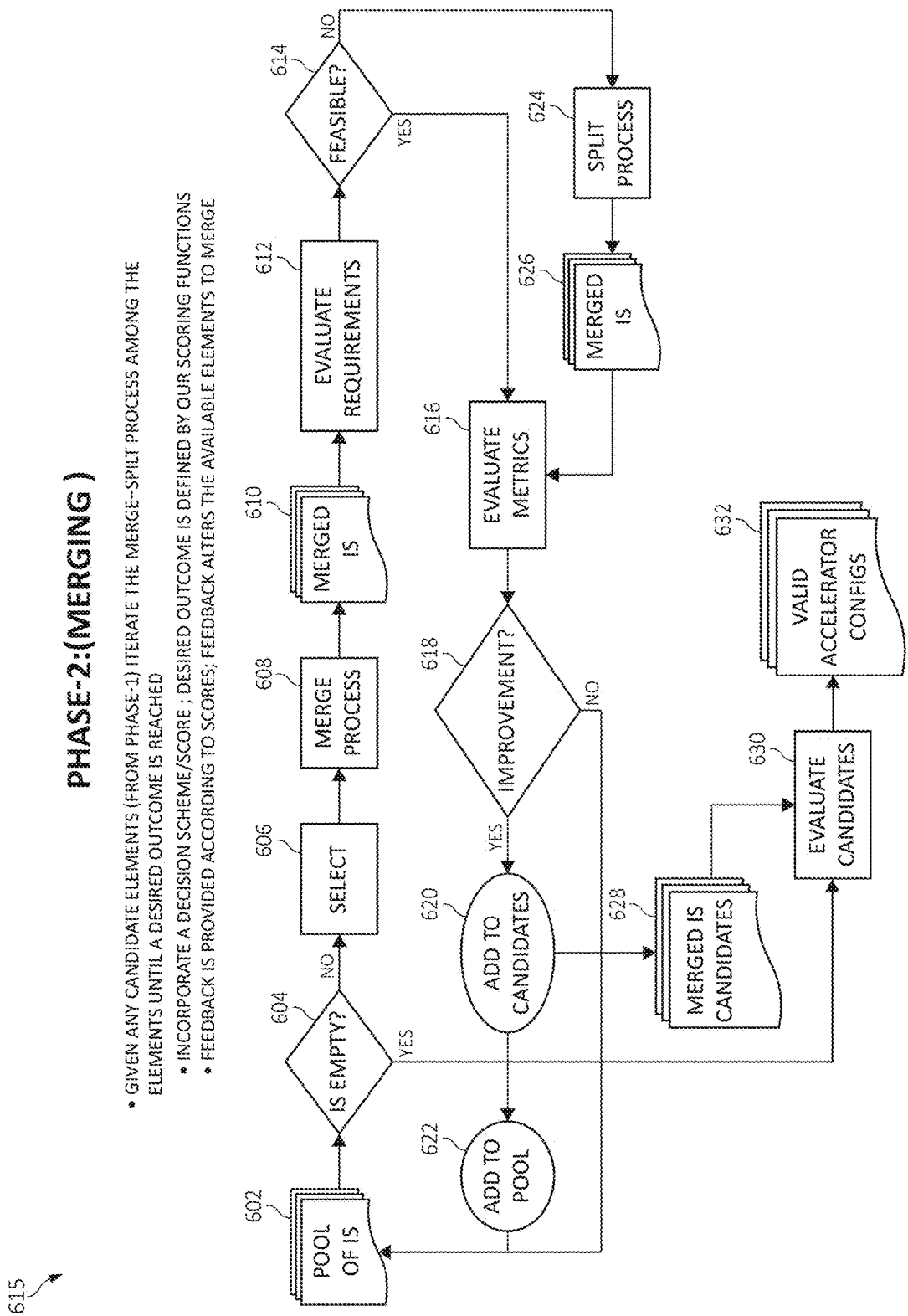
FIG. 6B is an additional block diagram depicting operations for providing instruction sequence merging and splitting for optimized accelerator implementation in a second phase a computing environment in accordance with an embodiment of the present invention.

Turning now to FIGS. 6A-6B, block diagram 600 depicts operations for providing instruction sequence merging and splitting for optimized accelerator implementation in the first phase (see also FIG. 5) and block diagram 615 depicts operations for providing instruction sequence merging and splitting for optimized accelerator implementation in a second phase (see also FIG. 5). In one aspect, one or more of the components, modules, services, applications, and/or functions described in FIGS. 1-5 may be used in FIGS. 6A-6B. In one aspect, repetitive description of like elements, components, modules, services, applications, and/or functions employed in other embodiments described herein is omitted for sake of brevity.

In one aspect, in phase 1 (e.g., IS selection), as depicted in FIG. 6A, the operations of phase 1 may supports several selection processes such as, for example, option A, B, and C. For example, as depicted in option A, each of steps 1, 2, and 3 may be selected where step 1) extracts hot Instruction sequences (IS), step 2), searches, for each IS, for similar IS from within an application ("matches"), and step 3) merges each IS with the selected matches (from an application).

In option B, the first selection process may include and select each of steps 1 and 3 (e.g., skipping step 2). That is, step 1) extracts hot Instruction sequences (IS) and step 3) merges each IS with the selected matches (from an application) or set of extracted IS (i.e., without need of further search in an application workload with no matching tool).

In option C, the first selection process may include and select each of steps 2 and 3 (e.g., skipping step 1). That is, step 2), searches, for each IS, for similar IS (e.g., function, basic block) and/or search for "matches" within an application ("matches"), and step 3) merges together each IS matches from an application with the selected matches (i.e., without using the initial selected IS).

Turning now to FIG. 6B, given any candidate elements (from phase-1), operations of FIG. 6B may include iteratively perform a merge-spilt process among the elements (e.g., instruction sequences) until a desired outcome is reached and incorporate a decision scheme/score with a desired outcome being defined by a scoring function. Collected feedback may be used according to the scores and the feedback may alter the available elements to merge.

As shown, the various steps and blocks of functionality are depicted with arrows designating the steps and blocks' 615 relationships with each other and to show process flow. Additionally, descriptive information is also seen relating each of the functional steps and blocks 615. As will be seen, many of the functional steps and blocks may also be considered "modules" or "components" of functionality, in the same descriptive sense as has been previously described in FIGS. 1-5. With the foregoing in mind, the module blocks 615 may also be incorporated into various hardware and software components of a system for providing instruction sequence merging and splitting for optimized accelerator implementation in accordance with the present invention. Many of the functional blocks 615 may execute as background processes on various components, either in distributed computing components, or on the user device, or elsewhere.

Starting in block 604, a determination operation may be performed to determine if a pool of instruction sequences ("IS") 602 is exists (e.g., are the IS pools empty?). If yes at block 604 (e.g., the pool of IS is empty), all IS candidates may be evaluated and determine valid accelerator configurations, as in blocks 630 and 632.

If no at block 604, one or more of the IS (or "IS code blocks") may be selected (e.g., accessed, analyzed, extracted, and/or selected) (to start the merge process), as in block 606. A merge operation may be performed on the selected IS to generate merged IS 610, as in block 608. Using the merged IS, one or more requirements (which may be based on various selected or defined constraints) may be evaluated, as in block 612. A determination operation may be performed to determine if the requirements are feasible, as in block 614. That is, as part of block 612 (for evaluating requirements for merging), each system may include accelerator "slots." Some number of individual accelerators that can be supported and reflects limitations of a network/bus interconnect etc.). Each accelerator slot may have required sizes, energy requirements (e.g., total area, power, etc.), and even limitations per slot (and/or globally). Accordingly, a merge of IS may be feasible if there exists an accelerator slot has requirements less than a defined threshold (e.g., the accelerator slot that can handle the costs less than a defined energy constraint such as, for example, a power requirement is less than the accelerator slot thresholds, an accelerator size is less than the slot size (e.g., number of functional units), and/or an area within slot thresholds).

It should be noted that in relation to the constraints for the merge operation, the constraints may be introduced at any point during a merge operation. For example, the data constraints for merging, may include, but not limited to, merging nodes with a same number of predecessors/data type, a maximum number of selectors/mux(at a node), a maximum live-out size, a maximum live-in size, etc. The operational constraints for merging may include, by way of example only, a maximum number of functional units, or overall area, etc.

If yes at block 614, one or more metrics may be evaluated (e.g., has there been an improvement based on the merged IS such as, for example, an improvement in power performance), as in block 616. For example, each merged IS (e.g., IS graph) may be evaluated using a scoring function using one or more parameters. In one aspect, the parameters may be Energy Weight per Operation "Ew(x)", a performance weight per operation "Pw(x)", an energy cost of memory access "Me", a performance cost of memory access "Mp".

One or more inputs may be provided such as, for example, instruction nodes "INodes", live in data nodes "Lin", live out data nodes "Lout". An output for evaluating the metrics may be a cost score (energy, performance) of graph "Ce, Cp", and/or efficiency in performance units per energy units "E". To compute the output the following operations/formulas may be performed (while assuming Lin and Lout to memory):

$$Ce = Ew(x \text{ for } x \text{ in Inodes}) + (Lin+Lout)*Me, \quad (1),$$

$$Cp = Pw(x \text{ for } x \text{ in Inodes if } x \text{ in Critical Path}) + (Lin+Lout)*Mp, \quad (2),$$

$$E = (1/Cp)/Ce \quad (3).$$

If no at block 614, a split operation (e.g., split process) may be performed on the merged IS, as in block 624. The split IS may be merged (e.g., a second merge operation), as in block 626. The functionality 615 may then move from block 626 to block 616.

At block 618, a determination operation may be performed to determine if any improvements are detected. If no improvements are detected in block 618, the merged IS may be discarded and return to block 602. If yes at block 618 (e.g., there are detected improvements at block 618), one or more IS may be added as candidate IS, as in block 620, and the merged IS may be added to the pool of IS 602, at block 622 and the candidate IS may be merged, as in block 628. The merged, candidate IS may be evaluated, in block 630. The merged, candidate IS may be used with valid accelerator configurations, as in block 632.

For evaluating candidates (at block 612) once the merge process ends (e.g., merging of block 610) and a set of merged IS has been determined/computed, a merge operations is feasible (at block 612) if the proposed merges are implementable for the IS candidates and Ce is less than a defined/selected energy constrain, the accelerator size is less than the slot size, and the number of accelerators are less than the accelerator slots. That is, the slot size refers to area/functional units available indistinctly without loss of generality. The feasibility may be determined at blocks 612 and 614.

An optimized (e.g., best) mix of accelerators may be selected from the feasible (e.g., block 630 for evaluating candidates) set such as, for example, using integer linear programming ("ILP") formulation or various heuristics or, using a given a set of candidate merges (e.g. (is1, is2, is3), (is0, is1), (is2, is3)) that may minimize/reduce the accelerator area, energy, latency and maximizing or minimizing over lapping kernels, etc. The over lapping kernels may be a metric that may be maximized or minimized according to user need/preference.

It should be noted that as used herein, the merging process may be performing using one or more types of merging operations for merging the IS. In one aspect, by way of example, only, an acyclic data flow graph ("DFG") representation may be used where each datum (value) and/or instruction is represented/put in a node. Each graph edge may reflect data flow (dependence). In operation, a two-step process may be executed where in step 1) compatible nodes may be merged, and in step 2) one or more new graphs may be created to replace some other nodes from two different graphs. The selection of nodes guarantees compatible function in the merged subgraph. Also, edges may be added from the first graph and edges from non-merged nodes may be added from the second graph. To further illustrate, consider the following heuristic that may be introduced for the merging process for a node merge, a predecessor merge, and/or a successor merge where G and H are two acyclic DFGs and R is an empty acyclic DFG. The heuristic may be used to parameterize a merge. Also, one or more constraints may be used. That is, the heuristic (as depicted in pseudocode) may be for all i nodes in graph G:

---

Find a node j in H such that i and j are compatible (same function, value, etc.)
    For pj in predecessors(j):
        If constraints met:
            Remove pj from H
            psuccess = True
    For sj in successors(j):
        If constraints met:
            Remove sj from H
            ssuccess = True
        If psuccess and success
            Remove node j from H.
    Add node i to R
    For remaining nodes in H:
        Add each node j from H to R
    For each edge e in G,
        add edge e to R
    For each edge f in H,
        add edge f to R

---

Said differently, for all the i nodes in graph G, a search operation is performed to step 1) identify a selected node j in graph H such that nodes i and j are compatible (e.g., same function, value, etc.). In step 2) for nodes pj in a predecessor node (j), if one or more constraints are met, the node pj may be removed from graph H and a success notification may be indicated ("psuccess=true"). For nodes sj in successors node (j), If the constraint are met, the node sj may be removed from graph H and a success notification may be indicated ("ssuccess=true"). If both steps are successful (e.g., psuccess and ssuccess), node j may be removed from graph H. Also, node i may be added to graph R. For remaining nodes in graph H, each node j from graph H may be added to graph R. For each edge e in graph G, edge e may be added to graph R. For each edge f in graph H, edge f may be added to graph R.

To further illustrate, consider diagram depicting an exemplary operations for performing a selecting and merging operation of the second phase of FIG. 6B. That is, a breadth-first tree 700 is depicted with a sorted list of instruction lists elements such as, for example, is0, is1, is2, is3 (islist[is0, is1, is2, is3, . . . ]) of IS elements.

In operation, in step 1) the first IS may be removed from the islist (e.g., islist(isx)).

In step 2, for each isy in the islist_x, in step 2a), a isx,isy is formed which is equal to isx with isy, in step 2b), feasibility requirement may be evaluated, in step 2c), if a merge is not compliant with accelerator requirements, then in step 2c.a), the isx,isy may be split/branched, and in step 2c.b), a isx,isy' is generated that is equal to the splitting of isx, isy, and in step 2d), a merge/split quality may be evaluated.

In step 2e), if the merged isx, isy is an improvement over individual isx and isy previous merge, the tree may be split/branched and the islist may be copied to islist_xy, isy may be removed from islist_xy, and the merged isx, isy may be added to a candidates list (e.g., a candidate IS list) and to the islist_xy. In step 2f), return a list of feasible merged IS candidates (for first IS isx).

In step 3) the IS candidates may be compared for using a metric evaluation (e.g., scoring) such as, for example, by selecting the best/optimized set of merge candidates for implementation using candidate evaluation.

Figure 7:
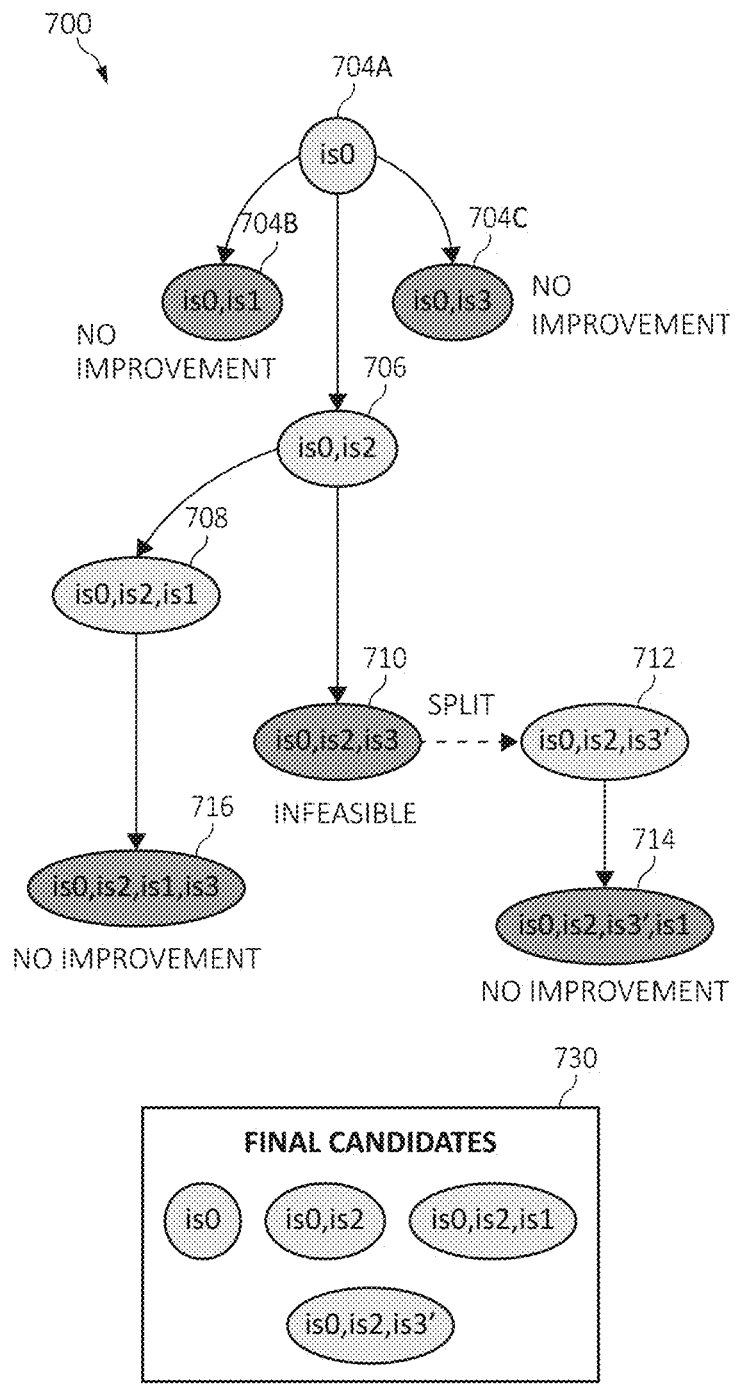
FIG. 7 is an additional block diagram depicting operations performing a merging operation of the second phase of FIG. 6B in accordance with an embodiment of the present invention.

To further illustrate, as depicted in FIG. 7, consider again, by way of example only, the list of IS elements (e.g., is0, is1, is2, is3). In block 704A, the is0 is a hot IS (e.g., frequently used/most executed IS). The is0 may first be removed and a branch tree is created as depicted in blocks 704B (is0, is1) and 704C (is0, is3). If there is no improvement in block 704B or 704C, block 706 may be created with is0, is2. From block 706, is0, is2, is1 may be created as in block 708, is0, is2, is3 as in block 710. Since is0, is2, is3 at block 710 is infeasible, is0, is2, is3 may be split to create is0, is2, is3' at block 712. Then, as in block 714, is0, is2, is3', is1 is merged together but yields no improvement. From block 708, is0, is2, is1, is3 may be created/merged yielding no improvement, as in block 716. Thus, the final candidates 730 may include 1) is0, 2) is0, is2, 3) is0, is2, is1, and/or is0, is2, is3'.

Figure 8:
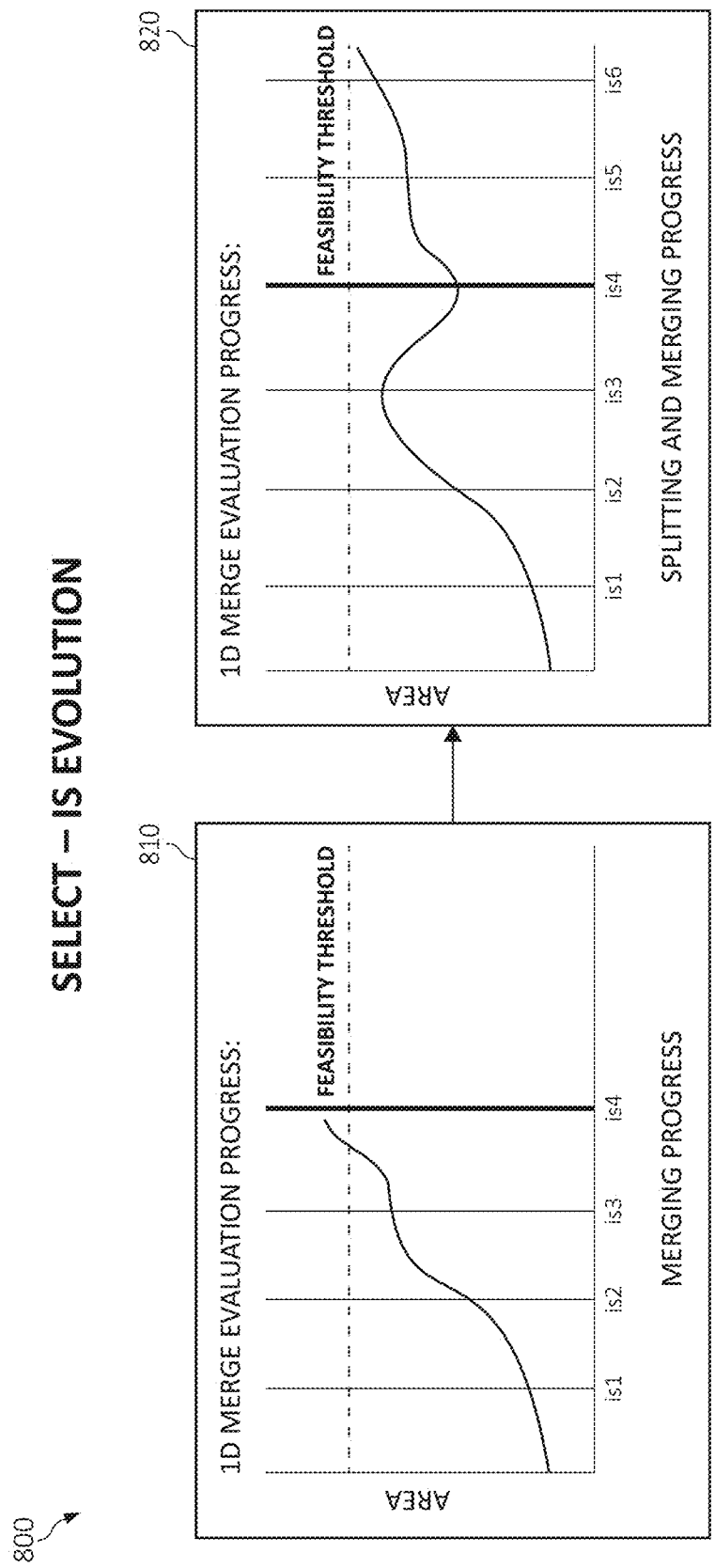
FIG. 8 is an graph diagram depicting operation results of adding and merging instruction sequence code blocks up to a defined threshold of the second phase of FIG. 6B in accordance with an embodiment of the present invention.

Turning now to FIG. 8, graph diagram 800 depicts operation results of adding and merging instruction sequence code blocks up to a defined threshold of the second phase of FIG. 6B. That is, as IS candidates are evaluated, the IS merge adds more accelerations functionality When IS surpasses feasibility threshold as depicted in graph 810, acceleration functionality may be decreased to increase overall accelerator implementation feasibility (e.g., the merged IS do not fit into accelerator slots, hence, a split operation is necessary), as depicted in graph 820. That is, is1, is2, is3 may be merged together where merging is4 surpasses a feasibility threshold such as, for example, is1, is2, is3, is4 needs splitting. In the split process any part of the merge (any IS) can be split.

Figure 9A:
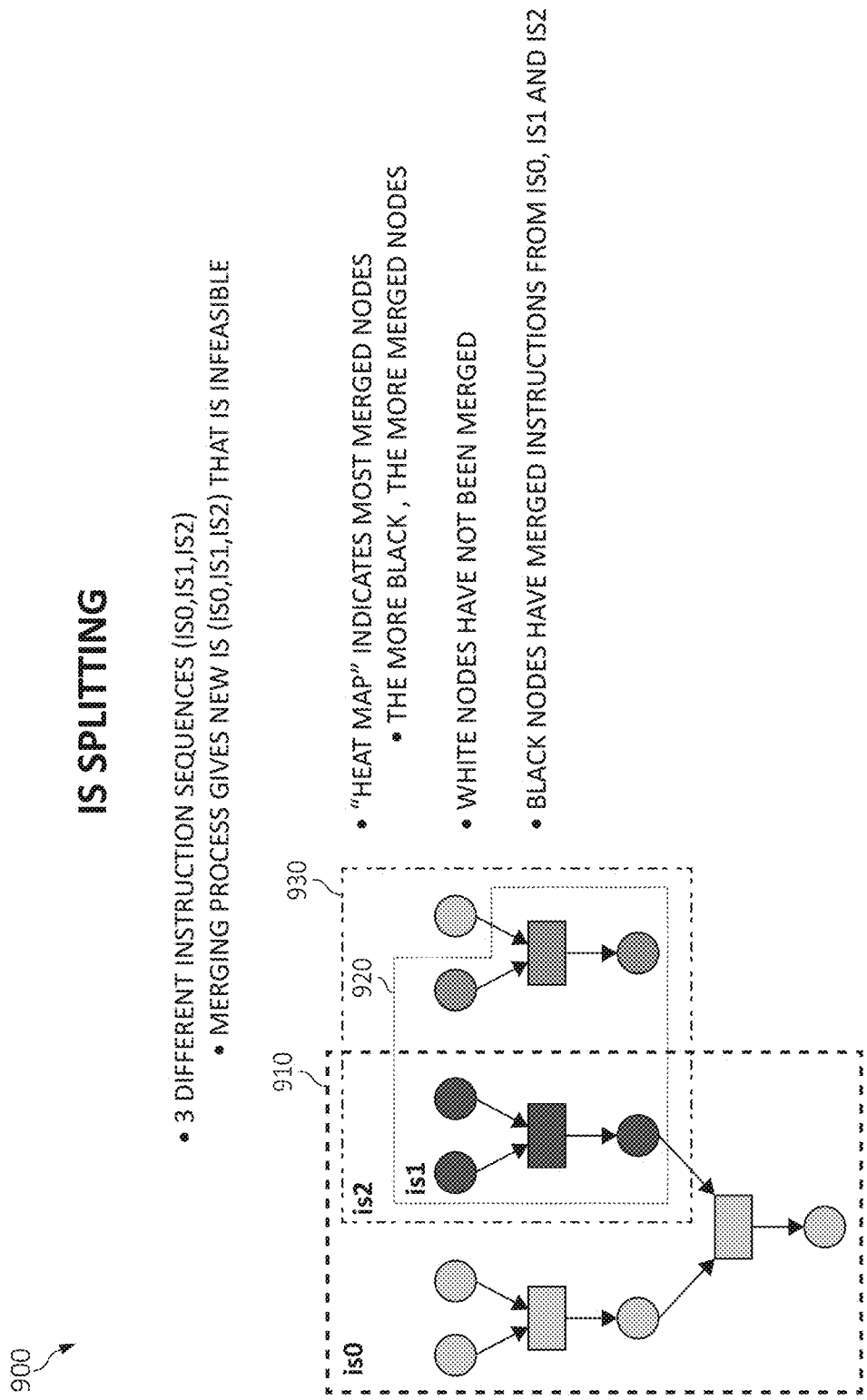
Figure 9B:
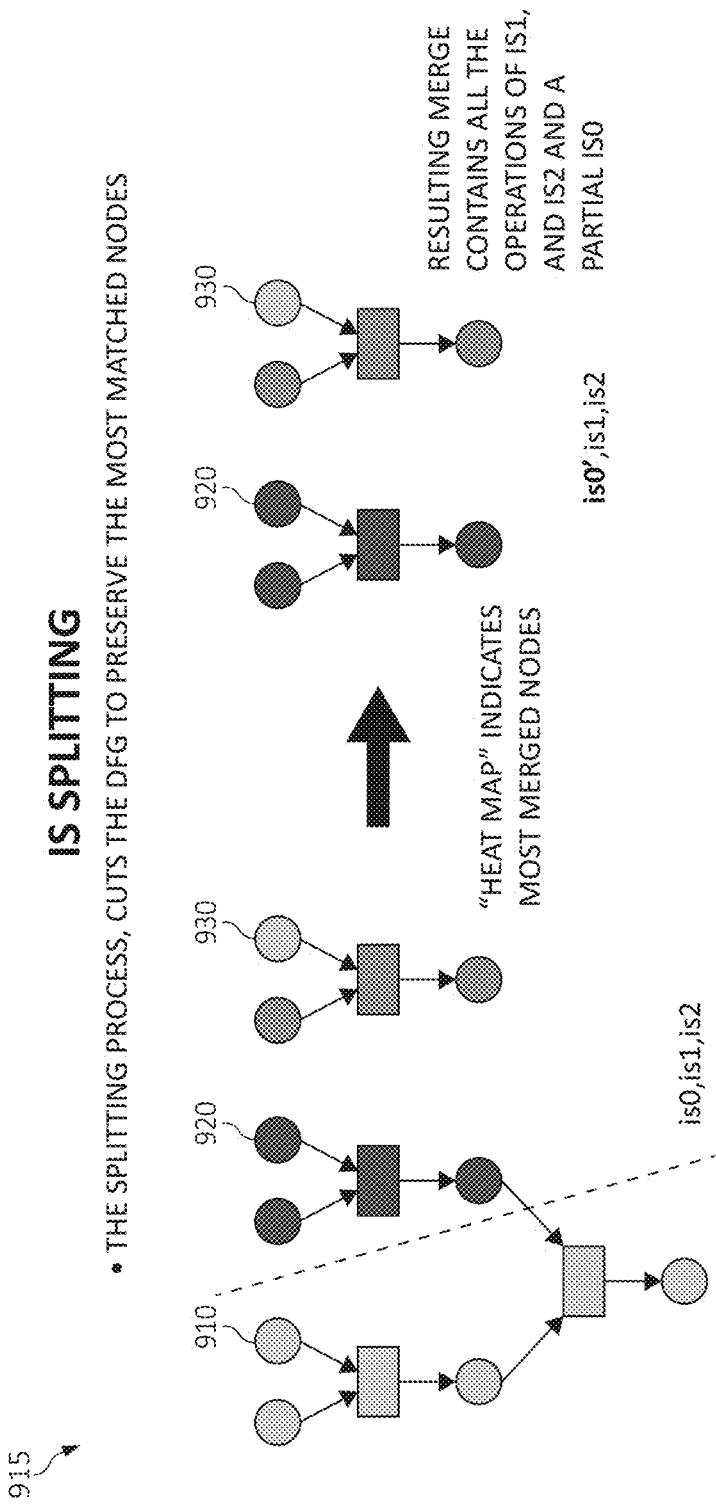

Turning now to FIGS. 9A-9C, diagrams 900, 915, and 925 depict exemplary operations for performing a splitting and merging operation. In one aspect, one or more of the components, modules, services, applications, and/or functions described in FIGS. 1-8 may be used in FIGS. 9A-9C. In one aspect, repetitive description of like elements, components, modules, services, applications, and/or functions employed in other embodiments described herein (e.g., FIGS. 1-8) is omitted for sake.

As depicted in FIGS. 9A-9C, in relation to IS splitting, given any DFG, if a merge process produces an infeasible DFG, a new DFG may be created by splitting the merged DFG according to a scoring operation. The IS splitting yields a new DFG that includes a combination of IS that include parts of, or all of the original IS, which reduces the footprint of a potential accelerator while preserving most relevant (significant) matched DFG nodes.

For example, consider the 3 different instruction sequences (is0, is1, is2) in FIGS. 9A-9C, as depicted in blocks 910, 920, and 930. The merging process provides a new IS (is0, is1, is2) that is infeasible is0 is1 is2. A "Heat map" indicates most merged nodes (e.g., the blacker/darker regions depicting the most merged nodes. The lighter/whiter regions indicating the nodes have not been merged. For example, as depicted in FIG. 9A, the medium colored/gray nodes have not been merged. The darker/black nodes have merged instructions from is0, is1 and is2.

As depicted in FIG. 9B, the splitting process may divide/cuts the DFG (e.g., as indicated in blocks 910 and 920) to preserve the most matched nodes. The resulting merges (e.g., blocks 920 and 930) contain all the operations of is1, and is2 and a partial is0.

Turning now to FIG. 9C, in terms of the IS (e.g., the instruction sequence execution for is0, is1, and is2, the potential accelerator is now able to fully accelerate/execute is1 and is2 and may partially accelerate/execute is0, where "Acc" refers to the offloaded region. The merge only includes a partial instruction sequence of the is0. The accelerator may actuate only on that subregion.

Thus, the merging/splitting process allows granularity to expand or contract according to the restrictions of the hardware. The merging/splitting process is agnostic/orthogonal to the input granularity, which can be a whole function, a sequence of basic blocks, or a snippet of instructions. As the merge/split process iteratively progresses/proceeds, new unique IS are identified. These are IS extracted from the original, hot IS set, reflecting the most important accelerated portions.

In an additional aspect, the splitting process may 1) select operation nodes with lowest matching count (list), 2) while the list is empty or the merge if feasible (e.g., list.empty or merge.feasible), a) one or more nodes may be removed from a graph, b) an evaluate operation may be performed, and c) a more feasible, merged IS may be returned/provided.

Figure 10:
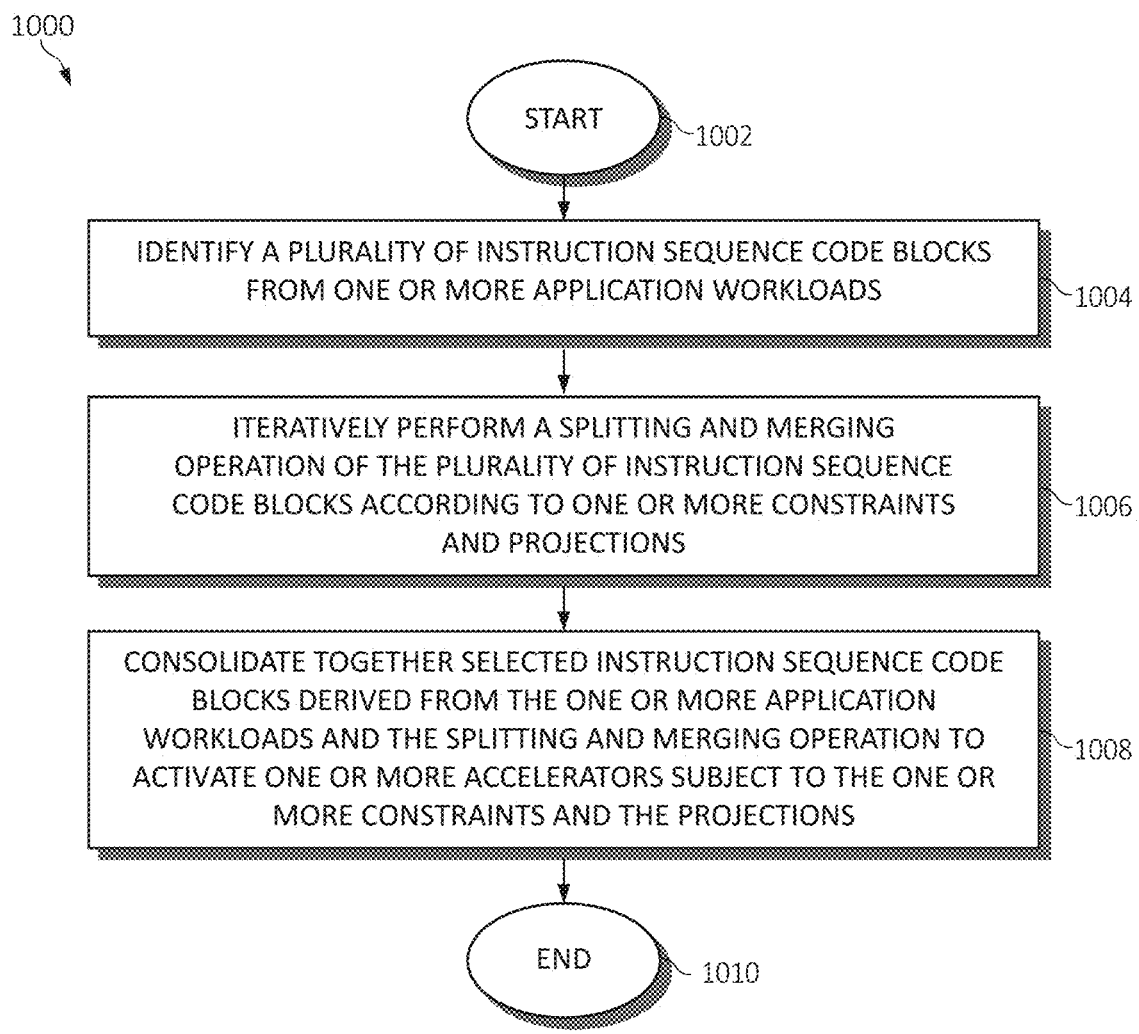
FIG. 10 is an additional flowchart diagram depicting a method for providing instruction sequence merging and splitting for optimized accelerator implementation in a computing environment in accordance with an embodiment of the present invention.

Turning now to FIG. 10, an additional method 1000 for providing instruction sequence merging and splitting for optimized accelerator implementation in a computing environment by a processor is depicted, in which various aspects of the illustrated embodiments may be implemented. The functionality 1000 may be implemented as a method executed as instructions on a machine, where the instructions are included on at least one computer readable medium or one non-transitory machine-readable storage medium. The functionality 1000 may start in block 1002.

A plurality of instruction sequence code blocks may be identified from one or more one or more application workloads, as in block 1004. A splitting and/or merging operation of the plurality of instruction sequence code blocks may be iteratively performed according to one or more constraints and projections, as in block 1006. Selected instruction sequence code blocks derived from one or more application workloads and the splitting and merging operation may be consolidated together to activate one or more accelerators subject to one or more constraints and projections, as in block 1008. The functionality 1000 may end, as in block 1010.

In one aspect, in conjunction with and/or as part of at least one block of FIG. 10, the operations of method 1000 may include each of the following. The operations of methods 1000 may define the one or more constraints according to one or more selected metrics and/or estimate the projections according to one or more selected metrics, performance speed, an energy reduction factor, performance factor, or a combination thereof relating to performance levels of the one or more accelerators The operations of methods 1000 may select the selected instruction sequence code blocks from the plurality of instruction sequence code blocks that are split and merged. The operations of methods 1000 may update the plurality of instruction sequence code blocks with additional instruction sequence code blocks upon completion of at least one iteration of the merging and splitting. The operations of methods 1000 may assign a score to each merged instruction sequence code blocks according to a degree of relevance to the one or more constraints and the estimated projections, and/or select as the selected instruction sequence code blocks those of the merged instruction sequence code blocks based on the assigned score.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for identifying and implementing optimized accelerators in a computing environment, using one or more processors, comprising:
identifying one or more instruction sequences of interest based on profiling information, the one or more instruction sequences of interest each comprising frequently executed instruction sequences from one or more application workloads;
iteratively performing a splitting and merging operation on candidate instruction sequences selected from the one or more instruction sequences of interest to generate an optimized set of selected instruction sequence code blocks from the candidate instruction sequences; and
consolidating together the selected instruction sequence code blocks derived from the one or more application workloads to activate one or more accelerators subject to one or more constraints and projections.

2. The method of claim 1, further including defining the one or more constraints according to one or more selected metrics.

3. The method of claim 1, further including estimate the projections according to selected metrics, factors, parameters, or a combination thereof relating to performance levels of the one or more accelerators.

4. The method of claim 1, further including iteratively performing the splitting and merging operation on a plurality of instruction sequence code blocks selected from the candidate instruction sequences according to the one or more constraints and the projections.

5. The method of claim 4, further including selecting the selected instruction sequence code blocks from the plurality of instruction sequence code blocks that are split and merged.

6. The method of claim 4, further including updating the plurality of instruction sequence code blocks with additional instruction sequence code blocks upon completion of at least one iteration of the merging and splitting.

7. The method of claim 1, further including:
assigning a score to each merged instruction sequence code blocks according to a degree of relevance to the one or more constraints and the projections; and
selecting as the selected instruction sequence code blocks those of the merged instruction sequence code blocks based on the assigned score.

8. A system for identifying and implementing optimized accelerators in a computing environment, the system comprising:
one or more processors of one or more computers with executable instructions that when executed cause the system to:
identify one or more instruction sequences of interest based on profiling information, the one or more instruction sequences of interest each comprising frequently executed instruction sequences from one or more application workloads;
iteratively perform a splitting and merging operation on candidate instruction sequences selected from the one or more instruction sequences of interest to generate an optimized set of selected instruction sequence code blocks from the candidate instruction sequences; and
consolidate together the selected instruction sequence code blocks derived from the one or more application workloads to activate one or more accelerators subject to one or more constraints and projections.

9. The system of claim 8, wherein the executable instructions when executed cause the system to define the one or more constraints according to one or more selected metrics.

10. The system of claim 8, wherein the executable instructions when executed cause the system to estimate the projections according to selected metrics, factors, parameters, or a combination thereof relating to performance levels of the one or more accelerators.

11. The system of claim 8, wherein the executable instructions when executed cause the system to perform the splitting and merging operation on a plurality of instruction sequence code blocks selected from the candidate instruction sequences according to the one or more constraints and the projections.

12. The system of claim 11, wherein the executable instructions when executed cause the system to select the selected instruction sequence code blocks from the plurality of instruction sequence code blocks that are split and merged.

13. The system of claim 11, wherein the executable instructions when executed cause the system to update the plurality of instruction sequence code blocks with additional instruction sequence code blocks upon completion of at least one iteration of the merging and splitting.

14. The system of claim 8, wherein the executable instructions when executed cause the system to:
assign a score to each merged instruction sequence code blocks according to a degree of
relevance to the one or more constraints and the projections; and
select as the selected instruction sequence code blocks those of the merged instruction sequence code blocks based on the assigned score.

15. A computer program product for identifying and implementing optimized accelerators in a computing environment, by a processor, the computer program product embodied on a non-transitory computer-readable storage medium having computer-readable program code portions stored therein, the computer-readable program code portions comprising:
an executable portion that identifies one or more instruction sequences of interest based on profiling information, the one or more instruction sequences of interest each comprising frequently executed instruction sequences from one or more application workloads;
an executable portion that iteratively performs a splitting and merging operation on candidate instruction sequences selected from the one or more instruction sequences of interest to generate an optimized set of selected instruction sequence code blocks from the candidate instruction sequences; and an executable portion that consolidates together the selected instruction sequence code blocks derived from the one or more application workloads to activate one or more accelerators subject to one or more constraints and projections.

16. The computer program product of claim 15, further including an executable portion that:

defines the one or more constraints according to one or more selected metrics; and estimates the projections according to selected metrics, factors, parameters, or a combination thereof relating to performance levels of the one or more accelerators.

17. The computer program product of claim 15, further including an executable portion that performs the splitting and merging operation on a plurality of instruction sequence code blocks selected from the candidate instruction sequences according to the one or more constraints and the projections.

18. The computer program product of claim 17, further including an executable portion that selects the selected instruction sequence code blocks from the plurality of instruction sequence code blocks that are split and merged.

19. The computer program product of claim 17, further including an executable portion that updates the plurality of instruction sequence code blocks with additional instruction sequence code blocks upon completion of at least one iteration of the merging and splitting.

20. The computer program product of claim 15, further including an executable portion that:

assigns a score to each merged instruction sequence code blocks according to a degree of relevance to the one or more constraints and the projections; and selects as the selected instruction sequence code blocks those of the merged instruction sequence code blocks based on the assigned score.

* * * * *